United States Patent
Patton et al.

(10) Patent No.: US 7,739,332 B2
(45) Date of Patent: Jun. 15, 2010

(54) SYSTEM AND METHOD FOR MULTI-CAMERA LIVE VIDEO FEED OVER A NETWORK

(75) Inventors: David Clay Patton, Fairfax, VA (US); Darin Edward Chambers, Leesberg, VA (US); Matt Jonathan Weinberg, Arlington, VA (US)

(73) Assignee: Trafficland, Inc., Fairfax, VA (US)

( * ) Notice: Subject to any disclaimer, the term of this patent is extended or adjusted under 35 U.S.C. 154(b) by 387 days.

(21) Appl. No.: 11/535,827

(22) Filed: Sep. 27, 2006

(65) Prior Publication Data

US 2008/0077596 A1    Mar. 27, 2008

(51) Int. Cl.
  *G06F 15/16* (2006.01)
(52) U.S. Cl. ..................................... 709/205
(58) Field of Classification Search ................. 709/205
  See application file for complete search history.

(56) References Cited

U.S. PATENT DOCUMENTS

| | | | |
|---|---|---|---|
| 6,564,380 | B1 | 5/2003 | Murphy |
| 2004/0078825 | A1* | 4/2004 | Murphy ...................... 725/109 |
| 2004/0244055 | A1* | 12/2004 | Takada et al. ................ 725/134 |
| 2007/0124476 | A1* | 5/2007 | Oesterreicher et al. ....... 709/226 |
| 2009/0222730 | A1* | 9/2009 | Wixson et al. ............... 715/723 |

OTHER PUBLICATIONS

International Search Report mailed May 19, 2008 in PCT/US07/79407.
Written Opinion mailed May 19, 2008 in PCT/US07/79407.
International Preliminary Report on Pantentability and written Opnion in PCT/US2007/079407; dated Mar. 31, 2009.

* cited by examiner

*Primary Examiner*—Vivek Srivastava
*Assistant Examiner*—Xiang Yu
(74) *Attorney, Agent, or Firm*—Womble Carlyle

(57) ABSTRACT

An internet user visits a web site and requests to see imagery from a specified one of a plurality of video cameras. At a system associated with the web site, a load distribution server assigns the user's request to one of a plurality of image servers. The assigned image server first checks its local image cache to see whether a recent image from the specified camera is stored there. If so, the image from that local image cache is sent to the user. If the local image cache does not have a recent image from the requested camera, the assigned image server then checks its local request cache to see whether an earlier process has recently requested the same imagery. If so, then the assigned image server simply waits for the earlier process to compete instead of initiating its own new image retrieval request. If no earlier process has recently requested the same imagery, the assigned image server issues its own image retrieval request. Information in image and the request caches of each image server is replicated across all the image servers.

22 Claims, 6 Drawing Sheets

122A, 122B, 122C

| | 130 | 132 | 134 | 136 |
|---|---|---|---|---|
| Camera #0001, Image-Size #1 | | | Timestamp #1-1 | Image Data #1-1 |
| Camera #0001, Image-Size #2 | | | Timestamp #1-2 | Image Data #1-2 |
| Camera #0001, Image-Size #3 | | | Timestamp #1-3 | Image Data #1-3 |
| Camera #0002, Image-Size #1 | | | Timestamp #2-1 | Image Data #2-1 |
| Camera #0002, Image-Size #2 | | | Timestamp #2-2 | Image Data #2-2 |
| Camera #0002, Image-Size #3 | | | Timestamp #2-3 | Image Data #2-3 |
| Camera #0003, Image-Size #1 | | | Timestamp #3-1 | Image Data #3-1 |
| ⋮ | | | | |
| Camera #xxxx, Image-Size #3 | | | | |

Image Cache

Fig. 3

Request Cache

Database Information 600

| Camera # | Encoder # | Channel # | IP Address | Authenticat Info | Params | Add'l info |
|---|---|---|---|---|---|---|
| 0001 | ABY | 3 | ... | ... | ... | ... |
| 0002 | CEG | 1 | ... | ... | ... | ... |
| | | | | | | |

SYSTEM AND METHOD FOR MULTI-CAMERA LIVE VIDEO FEED OVER A NETWORK

FIELD OF THE INVENTION

The present invention is directed to a method and system for providing users of the internet and other networks with live video feed from any one of plurality of distributed cameras. More particularly, it pertains to such a system and method that employs image cache memories to reduce latency in providing the requested image.

BACKGROUND OF THE INVENTION

U.S. Pat. No. 6,564,380 is directed to an internet-based video feed management system which controls, manages, and efficiently administers the distribution of live video feeds from on-site video cameras as well as other sources of video feeds to users at other locations. The system employs a network of local video-propagation servers located in different localities for receiving the video feeds from the different source locations, and a master authorization server for receiving and granting requests via Internet from requesting parties for access to any of the video feeds transmitted to the video-propagation servers. The master server issues an access code to the requesting party and establishing a unique publishing point for the requested video feed from the video-propagation server handling the feed. The on-site video cameras can capture video feeds of live events and transmit them to the video-propagation servers for access by requesting parties as live video feeds. Alternatively, a live video feed transmitted to a video-propagation server can be stored or cached in a video data storage provided with the propagation server, from which it can be re-transmitted later upon request. However, in this system, the images stored in the cache of one local video-propagation server is not provided to other local video-propagation servers.

SUMMARY OF THE INVENTION

In one aspect, the present invention is directed to a system for responding to a first request to view a current image from a selected one of a plurality of cameras at different locations, the first request received over a first network. The inventive system comprises:

At least one image server having associated therewith an image cache storing images from a first number of said plurality of cameras, and further having associated therewith a request cache storing information about prior requests for images from at least a second number of said plurality of cameras; wherein, in response to said first request, said at least one image server is configured to:

check its image cache to determine whether an image from the selected camera has recently been written into its image cache and, if so, provide said image from its image cache, in response to the first request;

if no image from the selected camera has recently been written into its image cache, check its request cache to determine whether there is a pending prior request for a new image from said selected camera;

if checking its request cache indicates that there is no pending prior request for a new image from said selected camera, then: issue a second request for a new image from the selected camera; wait until it receives the new image from the selected camera, in response to the second request; and provide the new image in response to the first request; and if checking its request cache indicates that a new image from said selected camera has recently be requested, then: wait until the new image from the selected camera is received by the first image server; and provide the new image in response to the first request.

The system may include a plurality of such image servers connected over a local network, and further comprise a load distribution server configured to receive the first request and assign the first request to one of said image servers. Such a system having a plurality of image servers may be configured to update the image caches of each of said plurality of the image servers with the new image received by the at least one image server from the selected camera in response to the second request.

In such a system, the at least one image server may run multiple processes, each process handling one request for a camera image.

The system may further comprise a database connected to said at least one image server, the database storing routing information comprising an internet protocol address of at least one encoder associated with said selected camera. The routing information may further comprise a channel of the encoder to which the selected camera is connected.

In another aspect, the present invention is directed to a method of responding to a first request to view a current image from a selected one of a plurality of cameras at different locations, the first request received over a first network, the method comprising:

receiving a first request at an image server, the image server having associated therewith an image cache storing images from a first number of said plurality of cameras, and further having associated therewith a request cache storing information about prior requests for images from at least a second number of said plurality of cameras;

checking the image cache to determine whether an image from the selected camera has recently been written into the image cache;

if an image from the selected camera has recently been written into said image cache, providing said image from said image cache, in response to the first request;

if no image from the selected camera has recently been written into said image cache, checking the request cache to determine whether there is a pending prior request for a new image from said selected camera;

if checking the request cache of the image server indicates that there is no pending prior request for a new image from said selected camera, then: issuing a second request for a new image from the selected camera; waiting until the new image is received by the image server from the selected camera, in response to the second request; and providing the new image in response to the first request; and if checking the request cache of the image server indicates that a new image from said selected camera has recently be requested, then: waiting until the new image from the selected camera is received by the image server; and providing the new image in response to the first request.

In the inventive method, a plurality of such image servers may be present, and one from among them is assigned to handle the first request. This assignment may come from a load distribution server. When a plurality of such image servers are present, the method may further comprise updating the images caches each of the image servers with the new image received by the first image server from the selected camera in response to the second request.

BRIEF DESCRIPTION OF THE DRAWINGS

For a better understanding of the present invention and to show how the same may be carried out in practice, reference will now be made to the accompanying drawings, in which:

FIG. 3 shows an exemplary image cache which may be used in conjunction with the present invention.

FIG. 6 shows exemplary information that may appear in records of a database and which may used to formulate an image retrieval request in accordance with one embodiment of the present invention.

DETAILED DESCRIPTION OF THE INVENTION

The contents of aforementioned U.S. Pat. No. 6,564,380 are incorporated by reference to the extent necessary to understand the present invention.

Figure 1:
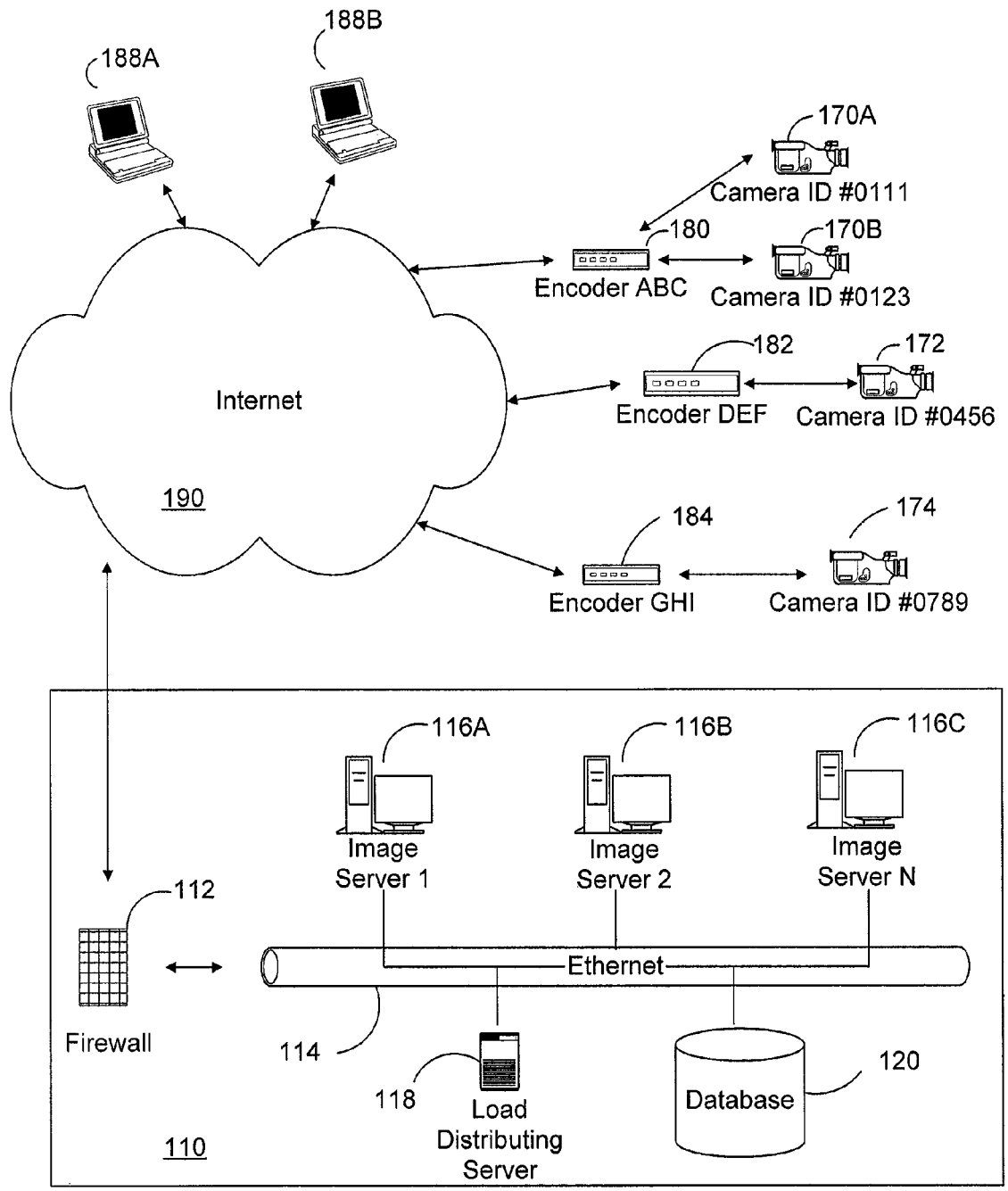
FIG. 1 depicts an exemplary environment in which a system in accordance with the present invention may be implemented.

FIG. 1 shows the overall environment in which the present invention may be used. A system 110 represents the installation of an operator of a web site.

In this particular embodiment, the web site provides a user, depicted by either computer 188A, 188B, with imagery from any one of a plurality of video cameras, shown generally as 170A, 170B, 172, 174. As seen in FIG. 1, cameras 170A, 170B are both connected to one encoder 180 (on separate channels); camera 172 is connected to a second encoder 182 and camera 174 is connected to third encoder 184. In one embodiment, each encoder 180, 182, 184 has a plurality of channels and a camera is connected to a specific channel of an associated encoder. And, as is known to those skilled in the art, an encoder grabs a frame from the camera and outputs the frame in digital form, at some specified resolution and size.

In general, each video camera views a different scene. In one embodiment, each camera shows a traffic scene, e.g., a portion of road so that users of the web site can see the traffic conditions on that road. Thus, the different cameras may show different portions of the same road, or they may show portions of entirely different roads, located in entirely different states, or even countries. Also, while only four cameras are shown in FIG. 1, it is understood that thousands of such cameras, distributed in many different areas of interest, may be present, each connected to an encoder. Each of the encoders 180, 182, 184 has a unique Internet Protocol (IP) address and is connected to the internet, shown generally as a cloud 190. An example of such a traffic-oriented web site is www.trafficland.com. As a result, all users 188A, 188B may selectively view the traffic scene seen by any one of the cameras 170A, 170B, 172, 174.

The encoders 180, 182, 184 and cameras may belong to someone other than the operator of the system 110. Thus, some cameras and encoders may belong to a private entity, while others may belong to a local government. This way, the entity to whom the cameras and encoders belong may contract with the operator of the system 110 to provide web-based access to imagery from scenes seen by a given camera.

The operator's system 110 includes a number of hardware and software assets. The system 110 may include a firewall 112 to permit the remaining assets to safely communicate across the internet 190. Behind the firewall 112 is a local area network 114, typically implemented with Ethernet, though other network standards may be used instead. Connected to the network 114 are a plurality of image servers 116A, 116B, 116C. While only three such image servers are shown, it is understood that other numbers of image servers may be used instead. Also connected to the network 114 is a load distribution server 118 and a database 120. It is understood that additional assets may also be connected to the local area network, such as web servers, output devices and the like. It is also understood that any of these assets may communicate with each other.

A user 188A, 188B visits the operator's web site via a browser and requests imagery from a specific camera. An http-type user request is formulated at the user's computer and is submitted to the system 110. This incoming request includes such information as the user's IP address, and camera information, such as the camera number and the resolution of the image to be provided to the user. The incoming request is sent to the load distribution server 118. The load distribution server 118 checks the instantaneous workloads of the imager servers 116A, 116B 116C and assigns the request to one of the servers.

Figure 2:
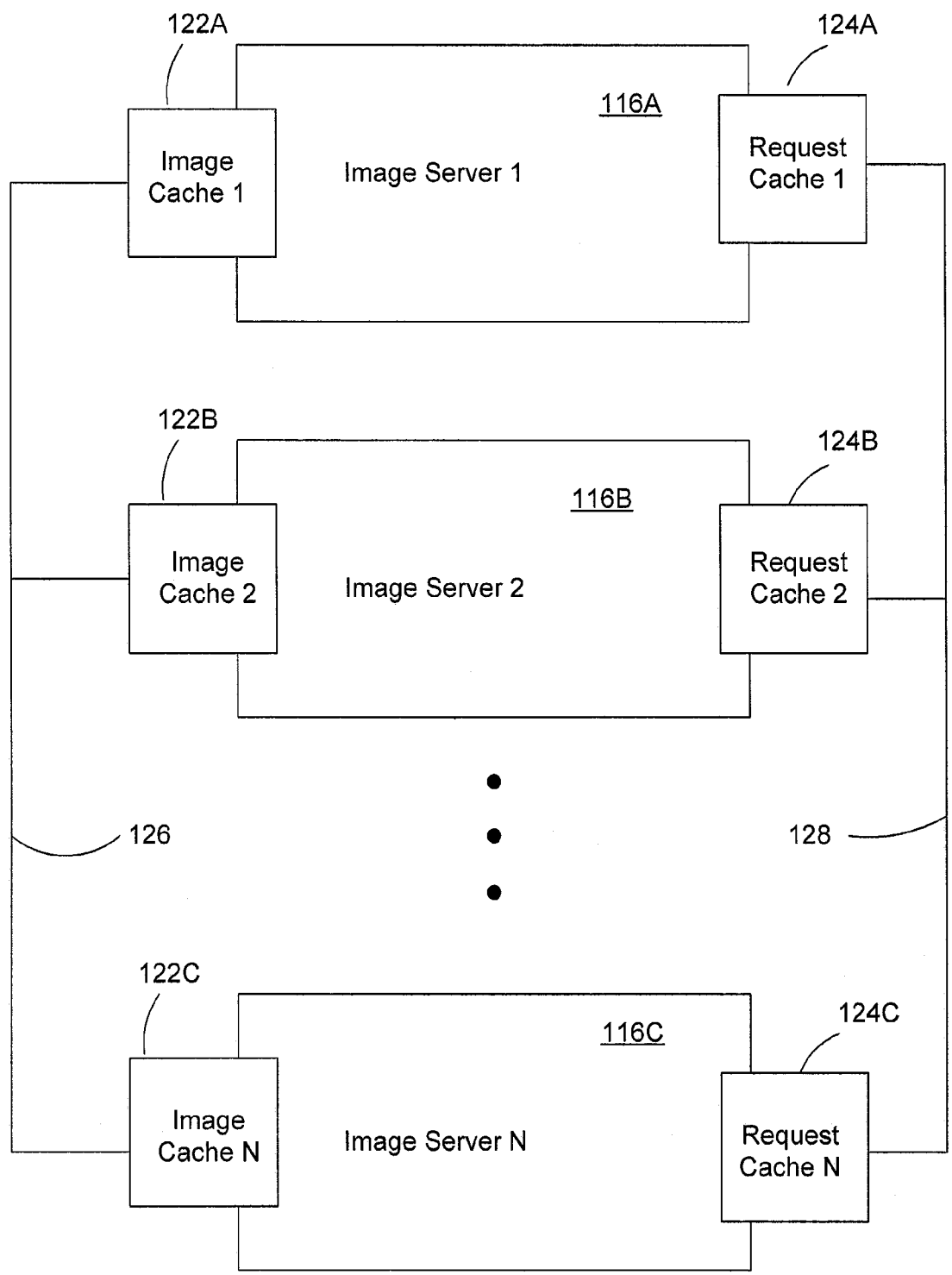
FIG. 2 shows the relationship between various image servers and their cache memories

As seen in FIG. 2, each of the image servers 116A, 116B, 116C has associated therewith an image cache and a request cache. Image server 116A has image cache 122A and request cache 124A; image server 116B has image cache 122B and request cache 124B; and image server 116C has image cache 122C and request cache 124C. The connection 126 between the image caches merely represents that new information written into one of the three image caches is replicated in the other two image caches. Similarly, the connection 128 between the request caches merely represents that new information written into one of the three request caches is replicated in the other two request caches. While FIG. 2 shows the image and request caches to physically separate from one another, it is understood that they may be contiguous, or even interleaved.

Each image cache and request cache comprises a portion of memory belonging a specific server. Importantly, each image server 116A, 116B, 116C executes a cache-controller application, such as "EHcache", which is known to those of ordinary skill in the art, to control the organization and operation of the respective image and request caches. As a consequence, an entry made into any one of the three image caches 122A, 122B, 122C is automatically replicated in the other two image caches. Similarly, an entry made into any one of the three request caches 124A, 124B, 124C is automatically replicated in the other two request caches. This ensures that each image server has a pair of local caches with information identical to that found in the local caches of the other image servers.

As best depicted in FIG. 3, each image cache 122A, 122B, 122C, is indexed by requested camera number 130 and the requested image size 132, the latter of which in this exemplary embodiment may be one of three sizes. The entries in the image cache are a timestamp 134 and the image data 136 corresponding to the requested for that camera/image size combination. The timestamp 134 indicates at which time the image data 136 was most recently entered, and so is an indicator of how current the image data is. Thus, if the difference between the current time and the timestamp 134 is less than some first threshold T1, it means that the corresponding image data 136 is current and so can be provided in response to the user's request.

In the image cache, the memory requirements for accommodating image data 136 is far larger than the memory requirements for accommodating the timestamp 134. Generally speaking, while only 32 bytes may be allotted for the timestamp 134, up to 12 Kbytes, or even more, may be needed to accommodate the image data.

Figure 4:
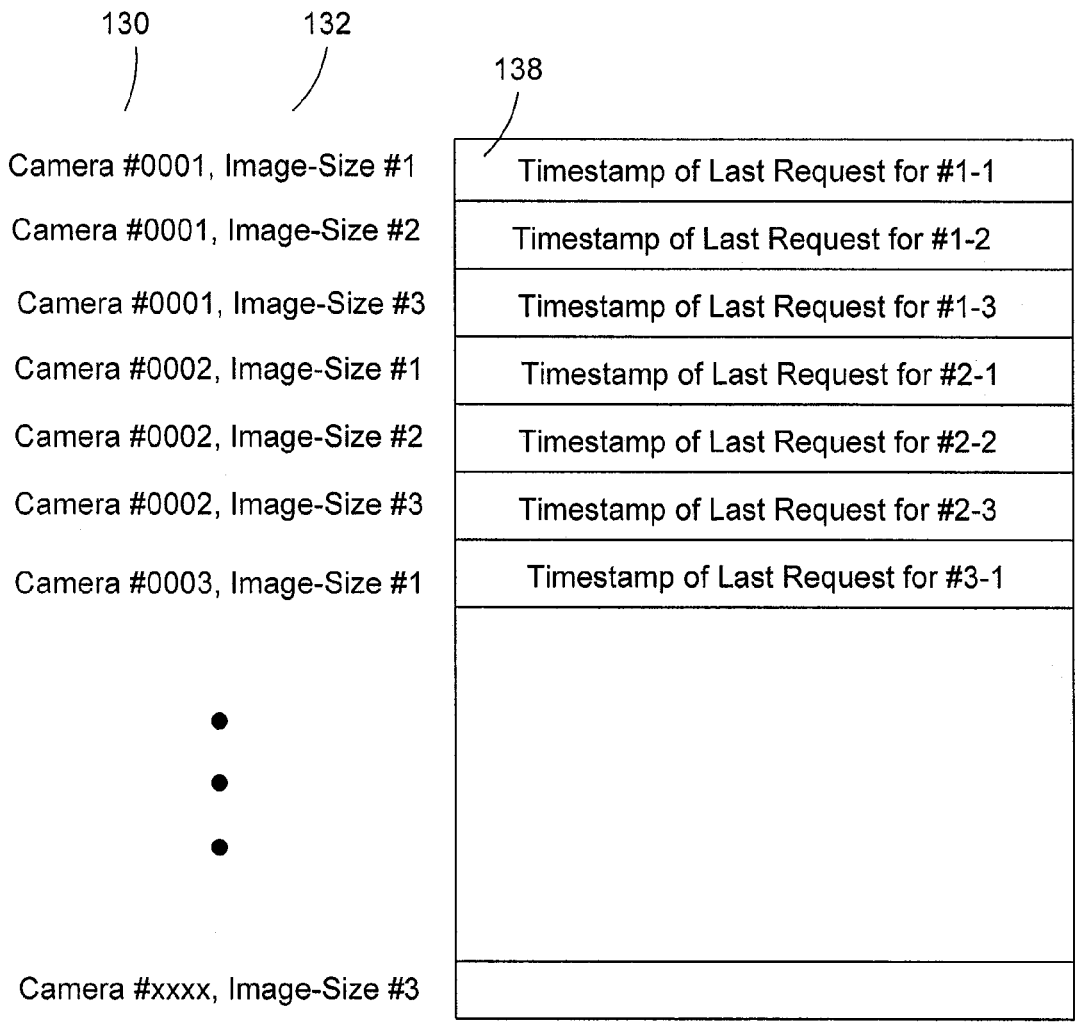
FIG. 4 shows an exemplary request cache which may be used in conjunction with the present invention.

As best depicted in FIG. 4, each request cache 124A, 124B, 124C, is also indexed by requested camera number 130 and the requested image size 132. The entries in the request cache are a last request timestamp 138 for that camera/image size combination. This entry represents the last time any of the servers 116A, 116B, 116C had to request a new (i.e., updated) image for that camera/image size combination. Thus, if the difference between the current time and the last request timestamp 138 is less than some second threshold T2, it means that an image frame fetch from the corresponding camera/image size is pending, and will shortly be fulfilled.

While FIGS. 3 and 4 illustrate the exemplary image cache and exemplary request cache in the form of separate tables, it is understood that the information in both caches may likewise be represented as a single table with three fields 134, 136, 138, each 'row' of the combined cache information table being indexed by camera ID 130 and image size 132. This again is testimony to the fact that the image cache and the request cache may form one contiguous portion, or even interleaved portion, of cache memory of the associated image server.

The cache-controller application controls updates to the cache memory associated with each image server 116A, 116B, 116C. In one embodiment, the cache-controller application is set to automatically replicate the cache contents every 10 msec by pushing updates from one cache entry to each of the other corresponding cache entries.

Each of the image servers 116A, 116B, 116C also executes an image engine application which services assigned user requests. The image engine application can support multiple thread or processes, each initiated by a user request. Thus, a single imager server can simultaneously serve hundreds, or even thousands of user requests.

Figure 5:
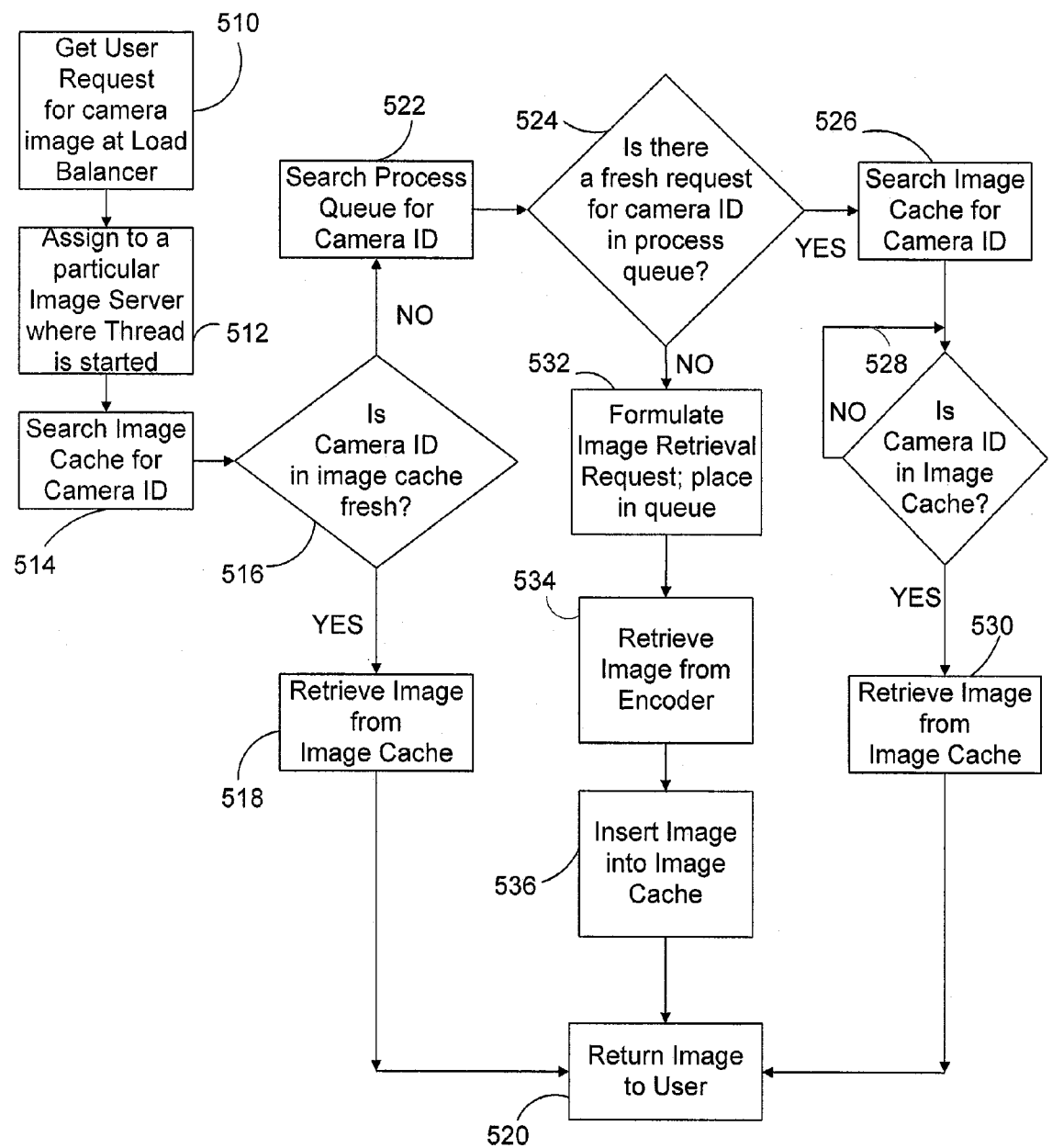
FIG. 5 shows a process flow diagram for an image engine application in accordance with one embodiment of the present invention.

FIG. 5 shows a process flow diagram 500 to illustrate what happens to a single user request that arrives at the system 110.

In step 510, the user request to view the scene at a specific camera (and also possible at a specific size and/or resolution) is received at the load distribution server 118. The user request is generally a http request with routing information so that a response may be sent back to the requesting user, camera identifying information, resolution and/or size of image requested, and perhaps other data as well.

In step 512, the load distribution server assigns the new request to one of the image servers 116A, 116B, 116C. The decision as to which of the plurality of servers the new request is to be assigned can be done in a number of ways. In one paradigm, the new request is given to the image server that has the fewest current image processes, i.e., is handling the fewest current requests. In another paradigm, the load distribution server 118 gives the new request to the image server whose previous request was received the further time in the past. In yet another paradigm, the load distribution server 118 determines an instantaneous load based on the dwell time of the requests and other factors to determine which of the image servers is the least taxed. People skilled in art are familiar with various load distribution servers, such as load balancing servers, round robin DNS servers, and the like In step 514, the assigned image server uses the provided camera ID 130 and image size 132 to index information in its own image cache.

In step 516, the assigned image server checks the corresponding timestamp entry to see whether the corresponding image data is fresh. This is done by comparing the current time with the timestamp. If the difference between the two is less than (or perhaps no greater than) some predetermined first threshold T1, then the corresponding image data from the image cache is deemed to be fresh, and is provided in response to the request. If, on the other hand, the difference between the two exceeds T1, the image data in the image cache is ignored. In one embodiment, the predetermined first threshold T1 is 1.5 secs.

If in step 516, it is determined that the image data in the image cache is fresh, control flows to step 518 in which the image data is retrieved from the image cache. Then, in step 520, the image data is returned to the user 188A, 188B.

If in step 516, it is determined that the image data in the image cache is not fresh, then control flows to step 522. In step 522, the request cache is searched for the camera ID 130 and the image size 132.

Next, in step 524, a determination is made as to whether there is a fresh, pending request currently being made for imagery corresponding to that camera ID 130 and image size 132. In other words, a search is made to see if some earlier, recent request is already causing the system to retrieve a fresh image frame of the specified size from the specific camera (and if so, the new request need not initiate a second such retrieval). It is understood that that earlier request may have been made by a process running on that same assigned server, or by a process on another image server.

If in step 524, it is determined that there is a fresh, pending request currently being made for that same camera ID and image size, in step 526 the assigned image server references its own image cache for that camera ID and image size. Next, in step 528, the assigned image server waits until its corresponding image cache has been updated (i.e., an updated image is loaded into the cache and the timestamp reset with a new value). This updating may be the result of an earlier process on that same assigned image server directly causing the newly retrieved camera image to be written into its own image cache or by a process on another server causing the newly retrieved camera image to be written into the image cache of that second server, with the image data subsequently being replicated in the image cache of the assigned image server.

Once it has been determined in step 528 that the image data has been updated, control flows to step 530 where the updated image data is retrieved from the image cache of the assigned image server and then sent to the user 188A, 188 in step 520.

If in step 524, it is determined that there is no fresh, pending request currently being made for that same camera ID and image size, controls flows to step 532.

If control reaches step 532, this means that (a) the cache image data is old and (b) no other pending process has requested the same image. Therefore, the assigned image server must get the requested image itself. In step 532, the assigned image server formulates an image retrieval request and places it in a process queue, so that a current image can be obtained from the specified camera over the internet and via the associated encoder.

The image retrieval request is assembled using information in the database 120. FIG. 6 depicts exemplary information 600 found in the records 602 of the database 120. For each camera ID 610, a record 620 may include information about the encoder 612 to which the camera is connected, the encoder channel 614 assigned to that camera, the encoder IP address 616, authentication information 618, one or more parameters 620 and even additional information 622. Not all of these fields are always needed to prepare an image retrieval request.

Once the retrieval request is formulated and placed in the process queue, the request cache of the assigned image server (or more precisely, the timestamp) is updated to indicate that a current request is pending for imagery from camera ID 130 at a particular image size 132. This entry is replicated in due course in the request caches of the other image servers. This way, any subsequent process requesting the same imagery can determine that a request for the same imagery is pending and so the subsequent process need not itself formulate a second image retrieval request.

Next, in step 534, the image retrieval request causes a new frame of the appropriate resolution/size to be grabbed from the specified camera via its associated encoder.

In step 536 the retrieved image is inserted into the image data 136 portion image cache 122A, 122B or 122C of the assigned image server and the timestamp 134 is updated. In due course, and in accordance with the cache replication policy, the updated information (both timestamp 134 and image data 136) is automatically replicated in the image caches of the other image servers.

Finally, in step 520, the image is returned to the user 188A, 188B.

Since, as described above, it is possible for a single image engine application to support multiple threads, a single image server having a single image cache and a single request cache may be used. In such case, there is no need for a load distribution server, since only one image server is used, and this single image server handles all user requests. However, the same concept of first checking the image cache to see if there is a recent image, and then checking the request cache to see if there is a recent, pending request, applies.

The above-described system potentially leads to tremendous improvement in the serving of video camera images to end users as compared with allowing the end users to request video images directly from a digital encoder attached to the camera(s). The image engine application can run on any number of servers, yet retrieves the image only once from the encoder in a given time period, irrespective of the number of servers and user requests for the image. The image engine application also caches the image for a specific time interval and only retrieves an updated image from the encoder when the cached image is determined to be out of date.

Although the present invention has been described to a certain degree of particularity, it should be understood that various alterations and modifications could be made without departing from the scope of the invention as hereinafter claimed.

What is claimed is:

1. A method of responding to a first request to view a current image from a selected one of a plurality of cameras at different locations, the first request received over a first network, the method comprising:

assigning a first image server among a plurality of image servers to handle the first request, each of said plurality of image servers having associated therewith an image cache storing images from a first number of said plurality of cameras, and further having associated therewith a request cache, wherein the request cache stores information about prior requests to retrieve updated images from at least a second number of said plurality of cameras;

checking the image cache of the first image server to determine whether an image from the selected camera has recently been written into the image cache of the first image server;

if an image from the selected camera has recently been written into said image cache of the first image server, providing said image from said image cache of the first image server, in response to the first request;

if no image from the selected camera has recently been written into said image cache of the first image server, checking the request cache of the first image server to determine whether there is a pending prior request to retrieve an updated image from said selected camera;

if checking the request cache of the first image server indicates that there is no pending prior request to retrieve an updated image from said selected camera, then:

issuing a second request to retrieve an updated image from the selected camera;

waiting until the updated image is received by the first image server from the selected camera, in response to the second request; and providing the updated image in response to the first request;

if checking the request cache of the first image server indicates that an updated image from said selected camera has recently been requested, then:

waiting until the updated image from the selected camera is received by the first image server; and providing the updated image in response to the first request.

2. The method according to claim 1, comprising:

updating the images caches of each of said plurality of the image servers with the updated image received by the first image server from the selected camera in response to the second request.

3. The method according to claim 1, comprising:

receiving the first request at a load distribution server; wherein the load distribution server assigns said first image server to handle the first request.

4. The method according to claim 1, comprising:

retrieving routing information from a database, prior to said step of issuing a second request to retrieve an updated image from the selected camera.

5. The method according to claim 4, wherein:

the routing information comprises an internet protocol address of an encoder to which the selected camera is connected.

6. The method according to claim 5, wherein:

the routing information further comprises a channel of said encoder to which the selected camera is connected.

7. A method of responding to a first request to view a current image from a selected one of a plurality of cameras at different locations, the first request received over a first network, the method comprising:

receiving a first request at an image server, the image server having associated therewith an image cache storing images from a first number of said plurality of cameras, and further having associated therewith a request cache, wherein the request cache stores information about prior requests to retrieve updated images from at least a second number of said plurality of cameras;

checking the image cache to determine whether an image from the selected camera has recently been written into the image cache;

if an image from the selected camera has recently been written into said image cache, providing said image from said image cache, in response to the first request;

if no image from the selected camera has recently been written into said image cache, checking the request cache to determine whether there is a pending prior request to retrieve an updated image from said selected camera;

if checking the request cache of the image server indicates that there is no pending prior request to retrieve an updated image from said selected camera, then:
  issuing a second request to retrieve an updated image from the selected camera;
  waiting until the updated image is received by the image server from the selected camera, in response to the second request; and
  providing the updated image in response to the first request;

if checking the request cache of the image server indicates that an updated image from said selected camera has recently been requested, then:
  waiting until the updated from the selected camera is received by the image server; and
  providing the updated image in response to the first request.

8. The method according to claim 7, comprising:
retrieving routing information from a database, prior to said step of issuing a second request to retrieve an updated image from the selected camera.

9. The method according to claim 8, wherein:
the routing information comprises an internet protocol address of an encoder to which the selected camera is connected.

10. The method according to claim 9, wherein:
the routing information further comprises a channel of said encoder to which the selected camera is connected.

11. A system for responding to a first request to view a current image from a selected one of a plurality of cameras at different locations, the first request received over a first network, the system comprising:
a plurality of image servers, each of said plurality of image servers having associated therewith an image cache storing images from a first number of said plurality of cameras, and further having associated therewith a request cache, wherein the request cache stores information about prior requests to retrieve updated images from at least a second number of said plurality of cameras;
wherein, in response to said first request, each image server is configured to:
  check its own image cache to determine whether an image from the selected camera has recently been written into its own image cache and, if so, provide said image from its own image cache, in response to the first request;
  if no image from the selected camera has recently been written into its image cache, check its own request cache to determine whether there is a pending prior request to retrieve an updated image from said selected camera;
  if checking its own request cache indicates that there is no pending prior request to retrieve an updated image from said selected camera, then:
    issue a second request to retrieve an updated image from the selected camera;
    wait until it receives the updated from the selected camera, in response to the second request; and
    provide the updated image in response to the first request;
  if checking its own request cache indicates that an updated image from said selected camera has recently been requested, then:
    wait until the updated image from the selected camera is received by the first image server; and
    provide the updated image in response to the first request.

12. The system according to claim 11, configured to update the image caches of each of said plurality of the image servers with the updated image received by the first image server from the selected camera in response to the second request.

13. The system according to claim 11, further comprising:
a load distribution server configured to receive the first request and assign the first request to one of said image servers.

14. The system according to claim 11, wherein each image server runs multiple processes, each process handling one request for a camera image.

15. The system according to claim 11, further comprising a database connected to said plurality of image servers, the database storing routing information comprising an internet protocol address of at least one encoder associated with said selected camera.

16. The system according to claim 15, wherein the routing information further comprises a channel of said encoder to which the selected camera is connected.

17. A system for responding to a first request to view a current image from a selected one of a plurality of cameras at different locations, the first request received over a first network, the system comprising:
at least one image server having associated therewith an image cache storing images from a first number of said plurality of cameras, and further having associated therewith a request cache, wherein the request cache stores information about prior requests to retrieve updated images from at least a second number of said plurality of cameras;
wherein, in response to said first request, said at least one image server is configured to:
  check its image cache to determine whether an image from the selected camera has recently been written into its image cache and, if so, provide said image from its image cache, in response to the first request;
  if no image from the selected camera has recently been written into its image cache, check its request cache to determine whether there is a pending prior request to retrieve an updated image from said selected camera;
  if checking its request cache indicates that there is no pending prior request to retrieve an updated image from said selected camera, then:
    issue a second request to retrieve an updated image from the selected camera;
    wait until it receives the updated image from the selected camera, in response to the second request; and
    provide the updated image in response to the first request;
  if checking its request cache indicates that an updated image from said selected camera has recently been requested, then:
    wait until the updated image from the selected camera is received by the first image server; and provide the updated image in response to the first request.

18. The system according to claim 17, further comprising:
a plurality of such image servers connected over a local network; and
a load distribution server configured to receive the first request and assign the first request to one of said image servers.

19. The system according to claim 18, configured to update the image caches of each of said plurality of the image servers with the updated image received by the at least one image server from the selected camera in response to the second request.

20. The system according to claim 17, wherein said at least one image server runs multiple processes, each process handling one request for a camera image.

21. The system according to claim 17, further comprising a database connected to said at least one image server, the database storing routing information comprising an internet protocol address of at least one encoder associated with said selected camera.

22. The system according to claim 21, wherein the routing information further comprises a channel of said encoder to which the selected camera is connected.

* * * * *